United States Patent [19]

Zuranski et al.

[11] Patent Number: 4,833,690
[45] Date of Patent: May 23, 1989

[54] REMOTE EYE PATTERN DISPLAY FOR DIGITAL MODEMS

[75] Inventors: Edward S. Zuranski, Largo; David W. Springer, St. Petersburg; Chad Balka, Largo; William L. Betts, St. Petersburg, all of Fla.

[73] Assignee: Paradyne Corporation, Largo, Fla.

[21] Appl. No.: 86,516

[22] Filed: Aug. 18, 1987

[51] Int. Cl.$^4$ .................... H04L 5/16; H04B 1/38
[52] U.S. Cl. .................... 375/8; 375/10
[58] Field of Search ............. 375/7, 8, 10, 39, 51; 370/10; 371/3, 22; 324/57 N; 340/801

[56] References Cited

U.S. PATENT DOCUMENTS

| | | | |
|---|---|---|---|
| 4,266,225 | 5/1981 | Burnett et al. | 340/801 |
| 4,449,223 | 5/1984 | Liskov et al. | 375/10 |
| 4,639,934 | 1/1987 | Zuranski et al. | 375/39 |
| 4,654,807 | 3/1987 | Bremer | 371/22 |
| 4,654,862 | 3/1987 | Camborde et al. | 324/57 N |
| 4,694,468 | 9/1987 | Cullum | 375/101 |

*Primary Examiner*—Robert L. Griffin
*Assistant Examiner*—Stephen Chin
*Attorney, Agent, or Firm*—Kane, Dalsimer, Sullivan, Kurucz, Levy, Eisele and Richard

[57] ABSTRACT

A system for transmission of an eye pattern from a remote modem to a local modem for oscilloscope display includes divider circuitry for adjusting the speed of transmission so as to accommodate the speed of the modem and provide a clear, unflickering oscilloscope display. The system also includes provisions for providing a continuous line impairment display as well as provisions for providing equalizer tap information.

7 Claims, 5 Drawing Sheets

REMOTE EYE PATTERN DISPLAY FOR DIGITAL MODEMS

BACKGROUND OF THE INVENTION

1. Field of The Invention

The invention relates to a method and apparatus for displaying the eye pattern of a remote modem at a local site.

2. Description of The Prior Art

The present state of the art generally involves the use of an oscilloscope at each end of a communication channel linking two or more modems and a trained observer at each end to evaluate the eye pattern display. As compared to the present invention, this procedure involves the disadvantages of added manpower and the availability of instant eye pattern evaluation should an observer not always be present at a remote modem.

OBJECTIVES AND SUMMARY OF THE INVENTION

It is a primary objective of the invention to display an eye pattern from a remote modem at a local station.

It is a further objective of this invention to provide an oscilloscope display at a local station of other information from a remote modem such as equalizer taps, normalized error signals, and line impairment display described in U.S. Pat. No. 4,639,934.

Other objectives and advantages shall become apparent from the following description of the invention.

The invention works by having the local station give a command to the remote site to send its eye pattern during a preamble of the local station's training message. The remote station receives this command and replaces the ordinary flow of data with eye pattern data. Since the eye pattern data operates at too high a rate to be transmitted, (e.g., 43,000 bits/second) even for a high speed modem such as a 19.2 kilobit modem, only one out of every three eye points is transmitted. The X-Y coordinate eye pattern points are assembled into packets. Bit pairs 1, 0 are used to delineate the boundaries of each packet for the local station. The receiver then unpacks the X-Y eye point packet and outputs it on its own oscilloscope eye point display.

There is a problem with flicker with only one of every three eye points being transmitted, however. To avoid this problem only a select subset of ⅛ of the possible eye pattern points are transmitted which provides for a clear oscilloscope display.

Another feature of the invention is the transmission of line impairment information (see U.S. Pat. No. 4,639,934). This is done by multiplexing the line impairment information with the eye pattern information. More specifically, a line impairment point is sent as a replacement for every eighth eye point. Although this multiplexing is done at random, the persistence of the oscilloscope gives the impression to the observer of a complete eye pattern and line impairment display.

DETAILED DESCRIPTION OF THE INVENTION

Figure 1:
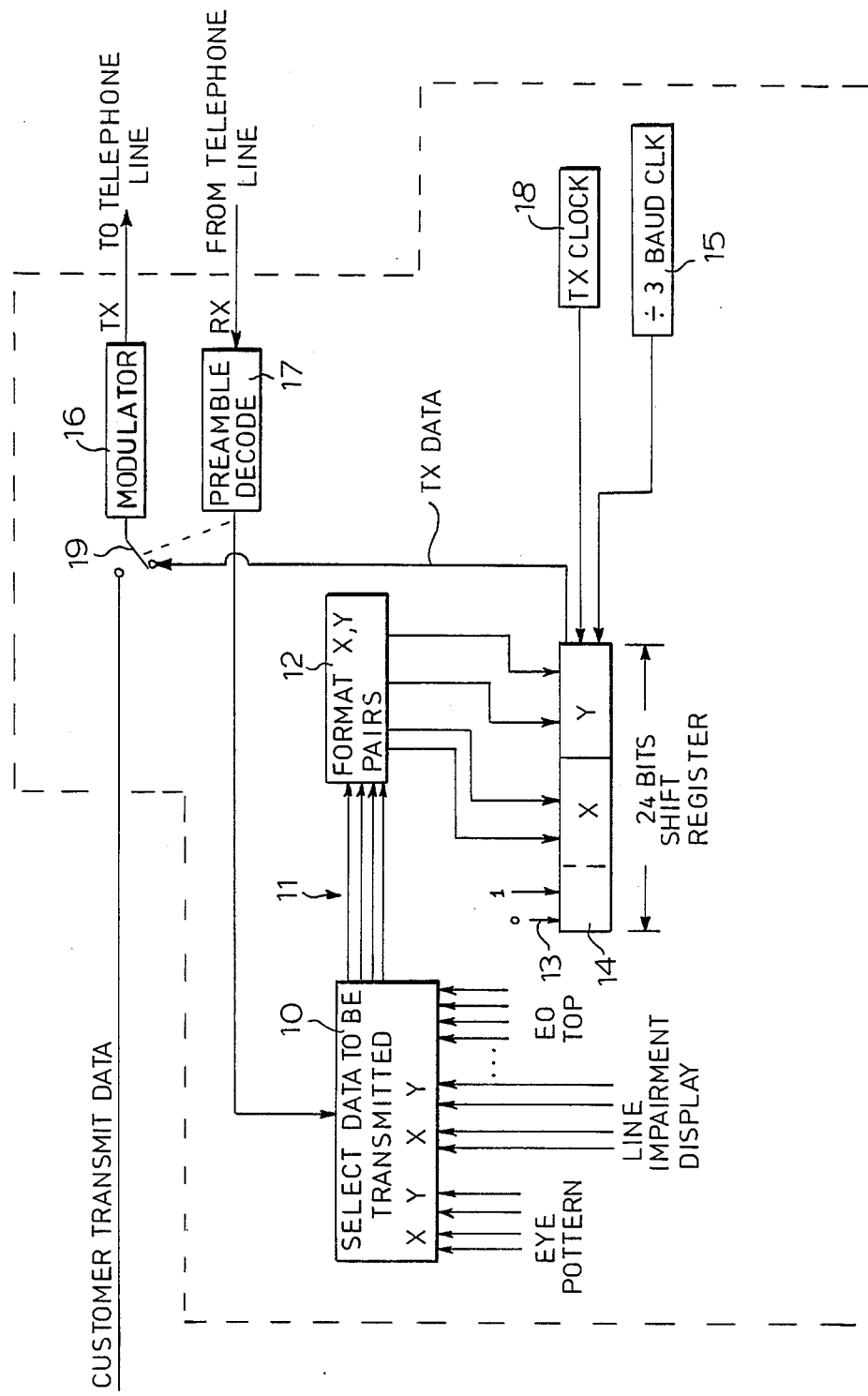
FIG. 1 is a schematic of the transmitter for the remote modem.
Figure 2:
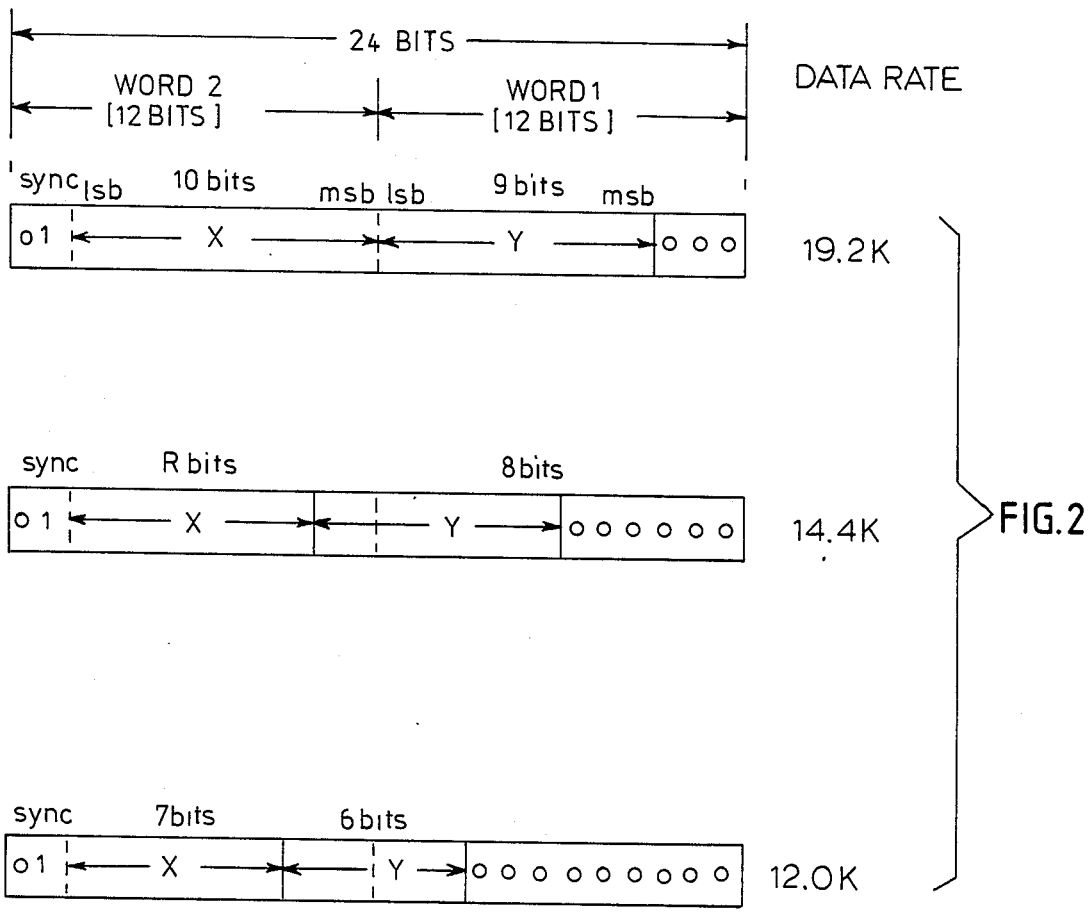
FIG. 2 is a graphical representation of the eye pattern data packets at the remote modem transmitter for the 19.2, 14.4 and 12.0 kbps data rates.

FIG. 1 discloses the remote modem or transmitter circuit. As shown therein, multiplexer 10 has eye pattern, line impairment points, and equalizer taps as inputs. The data to be transmitted is based on the code received from the local or receiver modem located at the other end of the communications channel. The selected data is formatted into two pairs of, for example, eight bits each which are sent along line 11 to module 12 where they are formatted into X-Y packets as shown in FIG. 2. Bits are accumulated in shift register 14 with the two synchronization bits being shown which form the boundaries of the packets being shown at 13. Again, the packet assembly is shown in FIG. 2. Divider module 15 then affects the eye pattern pairs such that ⅓ of them are transmitted through standard modem transmitter modulator 16 to a communications channel such as a telephone line. Other elements of the circuit include the transmitter clock module 18 which inputs to the shift register 14 and the preamble decoder 17 which receives an instruction in the preamble of the training period of the local or receiver modem, decodes, and transmits it to multiplexer 10 whereby the type of data requested by the local or master station is selected.

Switch 19 operates to interrupt the flow of customer transmitted data when a training message requiring information from multiplexer 10 is transmitted by the master or local modem.

FIG. 2 shows how bits are combined from a 24 bit shift register as a packet at data rates of 19.2 kilobits, 14.4 kilobits and 12.0 kilobits. The 19.2 kilobit transmitter transmits at 7 bits/baud, the 14.4 kilobit transmitter transmits at 6 bits/baud and the 12.0 kilobit transmitter transmits at 5 bits/baud. For example, for the 19.2 kilobit transmitter, 3 bands of 7 bits each could be transmitted.

Figure 3:
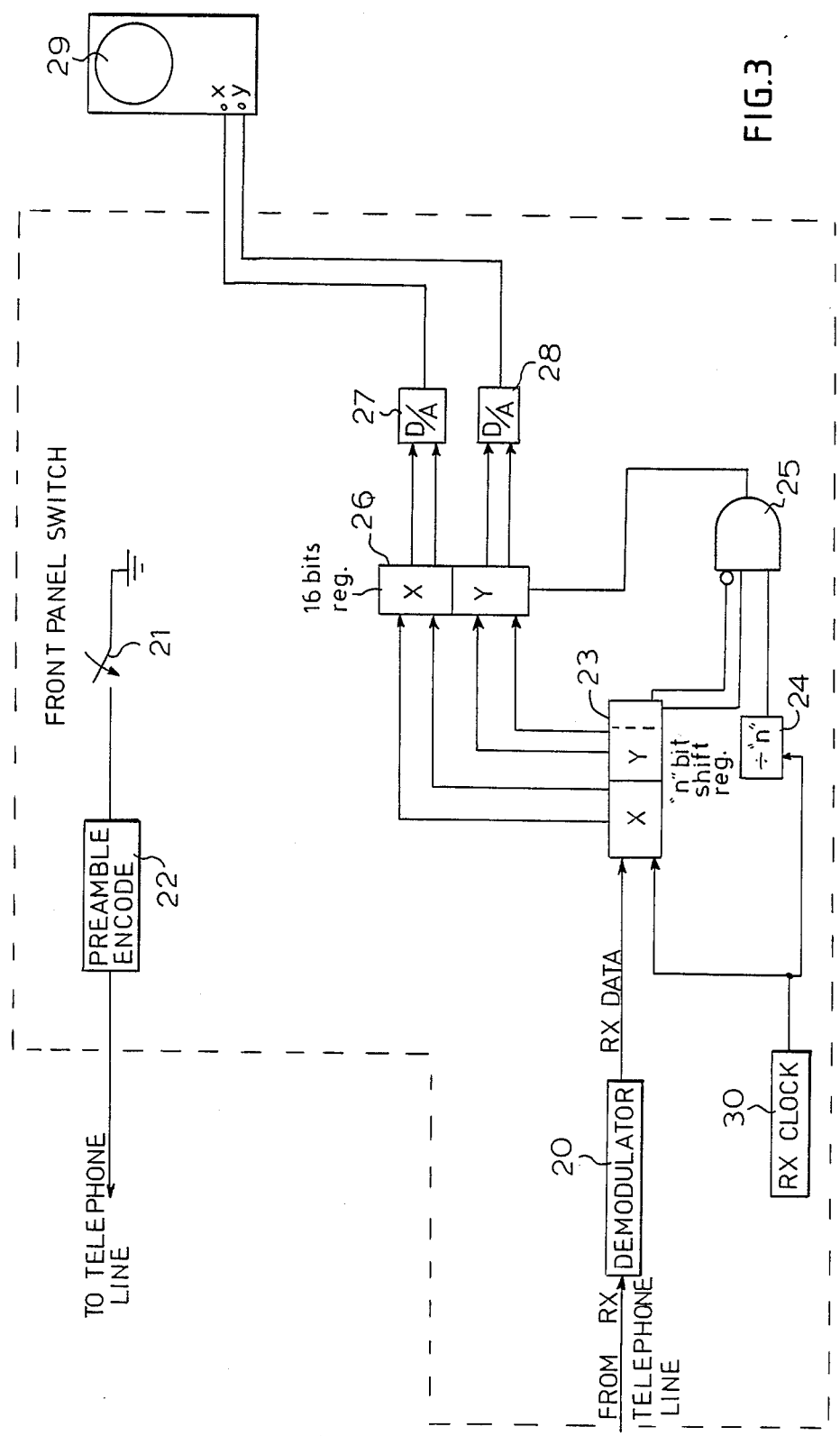
FIG. 3 is a schematic for the receiver for the local modem.

Referring to FIG. 3 the incoming data from a communication channel such as a telephone line enters standard modem demodulator 20 from whence emerges a bit stream. At this point the bit stream is indistinguishable as to whether it is customer data or requested information returning from the remote modem. However, the modem is informed that it is in a display mode by the closure of a front panel switch 21 which is connected to the preamble encoder 22. The bits are serially fed into shift register 23 which collects a number of bits depending on the speed of the modem. More specifically, it collects 21 bits if the modem speed is 19.2 kilobits, it collects 18 bits if the modem speed is 14.4 kilobits, and a it collects 15 bits if the modem speed is 12.0 kilobits. Divider module 24 operates to divide the contents in the shift register by the aforementioned numbers of 21, 18 and 15. It has an output to AND gate 25 which in turn gates the information to a 16 bit X-Y register 26 upon the simultaneous occurrence of the "10" synchronization pattern from shift register 23 and the output of divider module 24. The eye pattern data are conveyed to digital to analog converters 27 and 28, and then to oscilloscope 29. Clock 30 regulates the timing for both shift register 23 and divider module 24.

Figure 4:
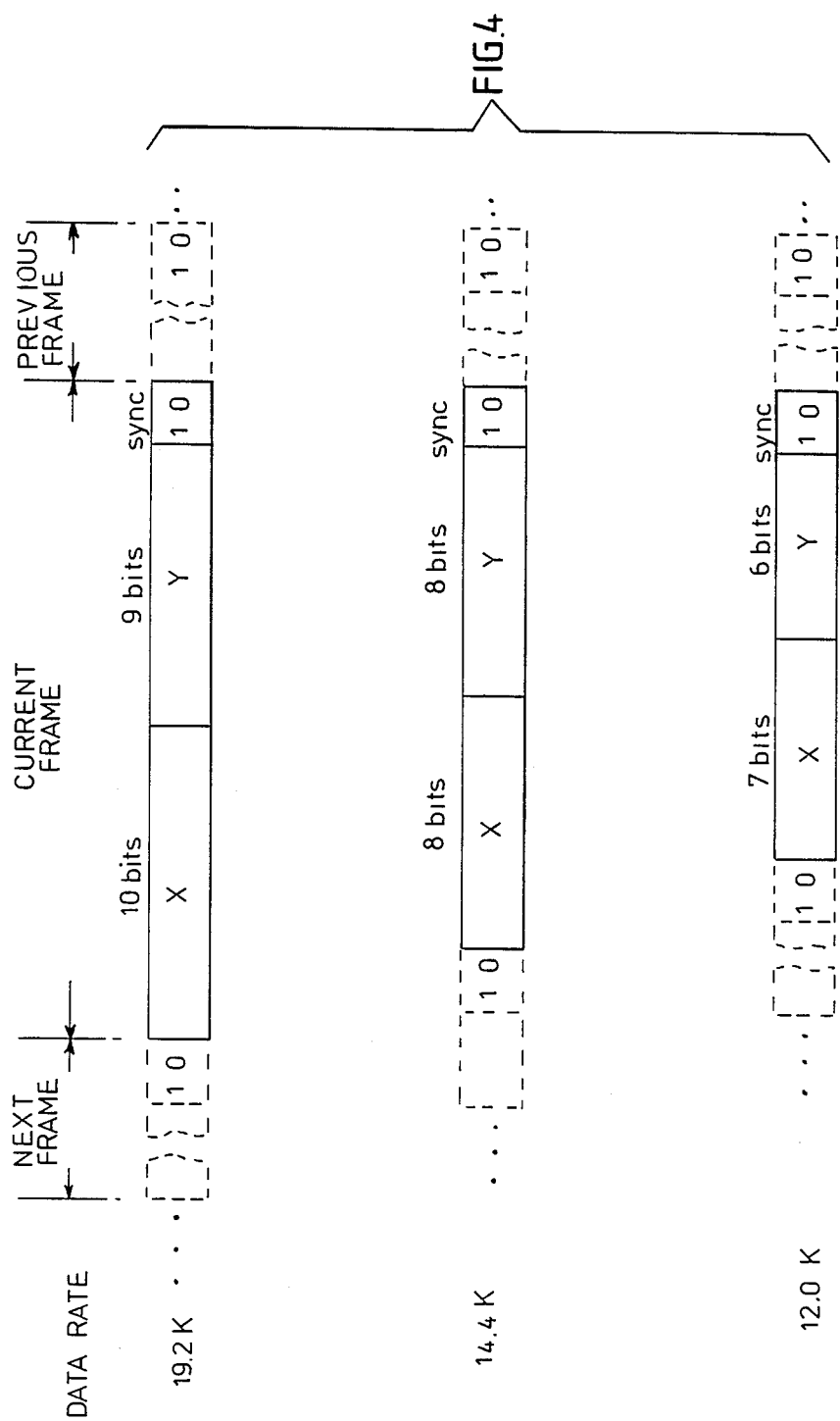
FIG. 4 is a graphical representation of the eye pattern data packets at the local modem receiver for 19.2, 14.4 and 12.0 kbps data rates.

FIG. 4 is analogous to FIG. 2 in that it shows the packet framing for the receiver modem. It essentially shows the same information except that the bits are in reverse order.

Figure 5:
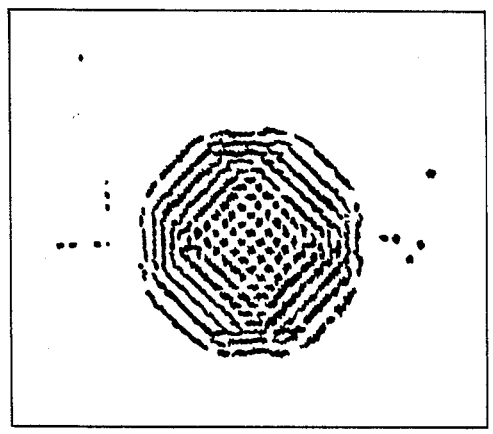
FIG. 5 is a display of an actual eye pattern generated at a remote station.
Figure 6:
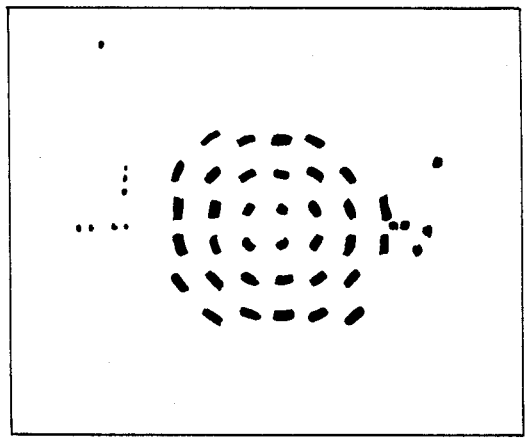
FIG. 6 is the oscilloscope display of the remote modem eye pattern as received at the local modem.

FIG. 5 is a representation of an actual eye pattern as generated at the remote modem. FIG. 6 is a representation of the same eye pattern as generated at the local or master modem.

Obviously numerous modifications may be made to the invention without departing from its scope as defined in the appended claims.

What is claimed is:

1. A system for transmission of an eye pattern and other data from an unmanned remote modem to a local modem for oscilloscope display comprising:
   means for sending a signal from the local modem to the remote modem requesting the eye pattern data to be transmitted;
   means for transmitting the requested eye pattern data from the remote modem to the local modem; and
   wherein said local modem further comprises receiver circuitry comprising a demodulator, a first shift register connected to an output of the demodulator, an AND gate having inputs connected to outputs of the shift register, a bit divider connected to another input of the AND gate, a second bit register connected to output of the first shift register and the AND gate, one or more digital to analog converters connected to X-Y outputs of the second register, and an oscilloscope connected to outputs of said one or more digital to analog converters.

2. The system of claim 1 further including means for transmitting requested line impairment data from the remote modem to the local modem.

3. The system of claim 1 further including means for transmitting requested equalizer tap data from the remote modem to the local modem.

4. The system of claim 1 wherein said means for transmitting comprises a multiplexer capable of selecting the requested data to be transmitted.

5. The system of claim 4 wherein said means for transmitting further comprises a module for formatting data received from said multiplexer into X, Y components and a shift register connected to parallel outputs of said formatting module for assembling the data bits into packets.

6. The system of claim 5 further comprising means for dividing the packet data such that the rate of data transmitted is appropriate for an nonflickering display on an oscilloscope located at the local modem.

7. The system of claim 2 wherein said line impairment data is multiplexed with said eye pattern data prior to transmission from said remote modem to said local modem.

* * * * *